United States Patent Office 3,312,261
Patented Apr. 4, 1967

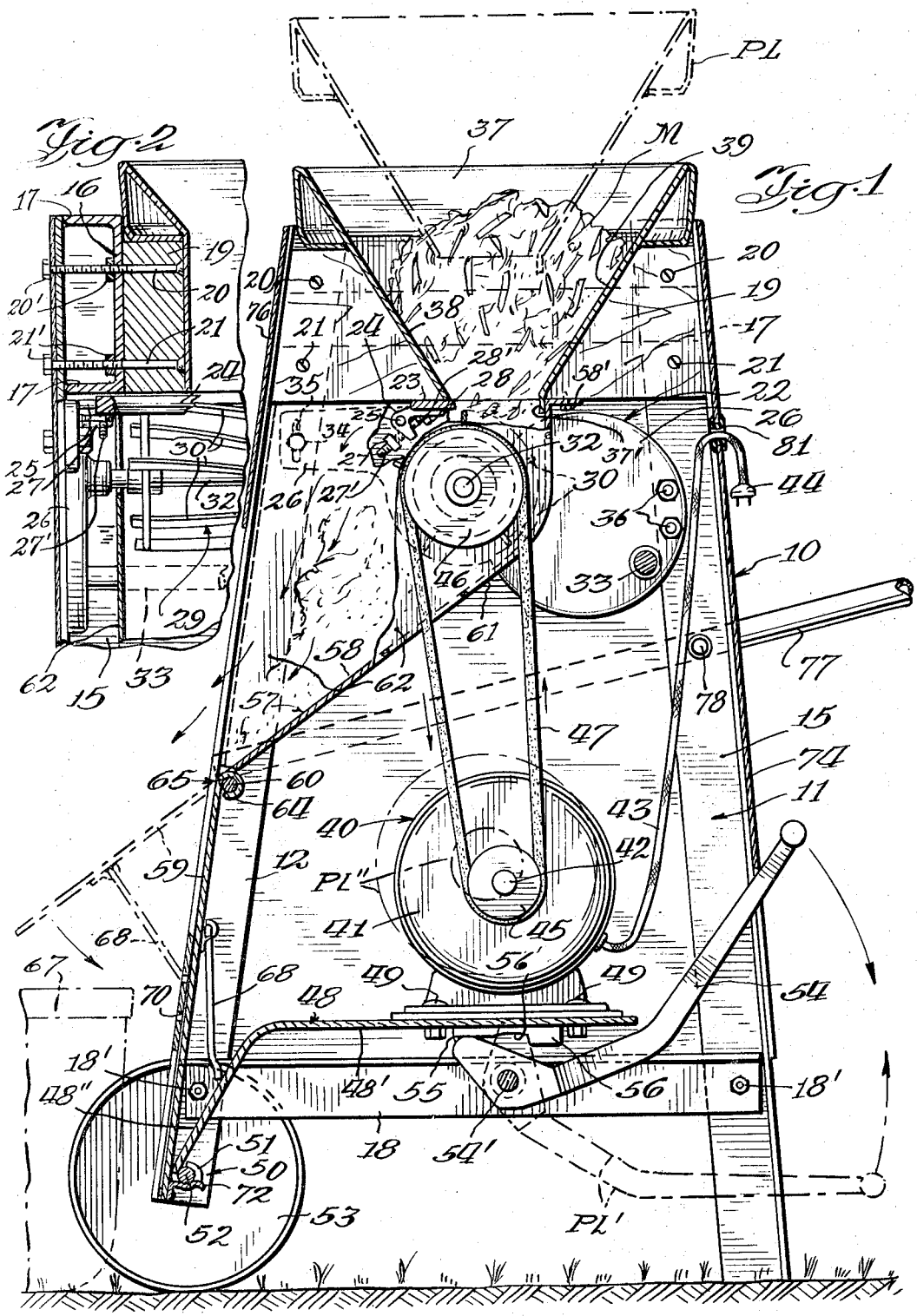

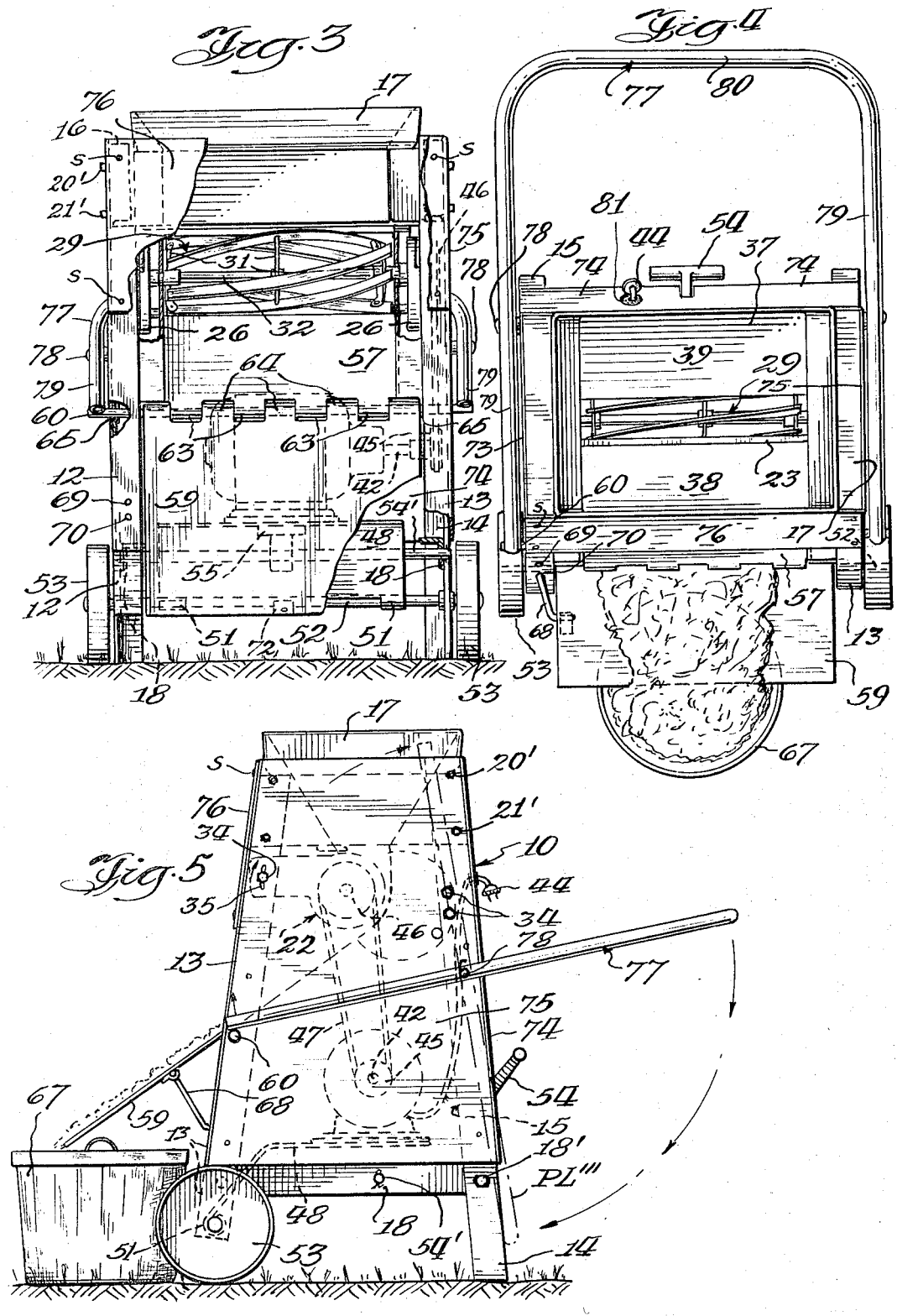

3,312,261
CUTTING MACHINE
Harold R. Linschoten, 14 Evergreen Lane,
Carpentersville, Ill. 60110
Filed Mar. 9, 1964, Ser. No. 350,212
3 Claims. (Cl. 146—123)

This invention relates to a machine for cutting materials into small pieces.

The purpose of the invention is to provide a machine which is simple and economical to manufacture, which is safe and effective in use, and which has a cutter assembly at the discharge end of a hopper, with the cutter assembly including a cutter reel having spirally arranged cutter blades, an adjustable knife in cutting relationship with the cutter blades, a pair of end plates to which the knife is connected and in which the cutter reel is rotatably mounted, and a brace rigidly connecting the end plates to each other, with means for driving the cutter reel.

It is a feature of the invention to provide a machine which is capable of reducing the size of materials, which is constructed in an economical manner, which can be easily and quickly assembled and disassembled, which is compact and which is easily movable from place to place.

In the drawings:

FIGURE 1 is a side elevational view, partly in section, showing a cutting machine in accordance with the invention;

FIGURE 2 is a fragmentary view showing a portion of a hopper, a cutter assembly and a frame;

FIGURE 3 is a front elevational view of the machine;

FIGURE 4 is a top plan view of the machine; and

FIGURE 5 is a side elevational view showing the manner in which panels enclose the moving components of the machine.

Referring now to the drawings, there is shown a machine generally indicated at 10 for reducing the size of materials M such as leaves, vines, corn stalks and the like, but it is to be understood that the machine is capable of being used on a wide variety of materials. The machine 10 includes a frame generally indicated at 11 having legs 12, 13, 14, and 15 which are shown to be inclined downwardly and away from each other with respect to the vertical. The frame 11 also includes spaced pairs of horizontally extending channel members 16 having arms 17 and angle members 18. A frame member 19 is disposed adjacent each channel member 16. Bolts 20 and 21 pass through each channel member 16, the adjacent frame member 19, and the legs 12 and 15 and 13 and 14, respectively. Nuts 20' and 21' rigidly secure members 16 and 19 and the legs 12 and 15, and 13 and 14 together. The angle members 18 are bolted to the legs 12 and 15 and 13 and 14, respectively, by bolts 18'.

In accordance with the invention, a cutter assembly generally indicated at 22 is mounted in the frame 11. The cutter assembly 22 preferably is of the same type as is used on a reel-type lawn mower. The cutter assembly 22 has an elongated generally horizontal knife 23 carried by a pivotally mounted support 24. The support 24 is pivotally mounted at each end by pivot pins 25 secured to opposed plates 26. Lugs 27 and 28 formed integrally with each end plate 26 threadably receive adjusting screws 27' and 28'. The cutter assembly 22 also includes a rotatably mounted cutter reel generally indicated at 29 having a plurality of elongated spirally arranged cutter blades 30 in cutting relationship to the knife 23. The cutter reel 29 includes a plurality of spaced blade mounting members 31 which securely mount the blades 29 to an elongated shaft 32. The ends of the shaft 32 are rotatably mounted in the end plates 26. A brace 33 rigidly connects the end plates 26 to each other. The cutter assembly 22 is mounted in the frame 11 by threaded fasteners 34 which pass through elongated slots 35 in legs 12 and 13, respectively, and also by threaded fasteners 36 which pass through the end plates 26 and the legs 14 and 15, respectively. A removably mounted hopper 37 is shown to rest on the frame members 19. The cutter assembly 22 is disposed at the discharge end of the hopper 37. The phantom lines PL illustrate that the hopper 37 can be removed by simply lifting it vertically. The hopper 37 has sloped sides 38 and 39.

A drive mechanism is generally indicated at 40. The drive mechanism 40 is shown to include a motor 41 having a drive shaft 42. An electrical cord 43 is shown to be connected at one end to an electrical connector 44 and at the other end to the motor 41. A gasoline motor can alternatively be provided, if desired. An annular drive member shown to take the form of a pulley 45 is secured to the drive shaft 41. The drive mechanism 40 also includes an annular drive member shown to take the form of a pulley 46 secured to the shaft 32. An endless flexible drive member, shown to take the form of an endless flexible V-belt 47, is trained over the pulleys 45 and 46. The motor 41 is shown to be secured to a pivotally mounted support 48 by threaded fasteners 49. The support 48 has a generally horizontal portion 48' and a downwardly extending portion 48". The portion 48" enables a shorter belt 47 to be used than if the motor 41 and hence the pulley 45 were at a lower level. A hinge generally indicated at 50 is shown to be formed by two widely spaced, hook-shaped 51 extensions of the downwardly extending portion 48" and a rod 52 which extends through legs 12 and 13. The rod 52 also rotatably mounts wheels 53.

For a motor of a particular weight, the horizontal distance between the pivot point, namely the rod 52, and the center of gravity of the motor 41 is sufficient to provide the proper tension on the belt 47. The motor 41 is positioned on the support in the frame 11 so that at least some of the weight of motor 41 caused tensioning of the belt 47.

During periods of non-use, the belt 47 can be selectively relieved of its tension by pivoting the support 48 and hence moving the pulley 45 toward the pulley 46. This can be accomplished by operating a treadle or actuator 54. The actuator 54 has a rounded cam portion 55 which is engaged with a plate 56 secured to the bottom of the support 48. When the actuator 54 is moved from the position shown by solid lines in FIGURE 1 to the position shown by phantom lines PL', the support 48 has been pivoted and the motor 41 and the pulley 45 are in the positions shown by phantom lines PL", thus relieving the tension on the belt 47, but the pulley 45 is not moved so far that the belt 47 leaves the V-shaped grooves in the pulleys 45 or 46. Because of the profiles of the cam portion 55 and a recess 56' in the lower face of the plate 56, the actuator 54 remains in the position indicated by phantom lines PL' unless it is actuated by the user.

A chute generally indicated at 57 shown to have a stationary upper chute portion 58 and a movable lower chute portion 59. The stationary chute portion 58 is secured to the frame members 19 at its upper end by the bolts 58' and by a rod 60 at its lower end. The stationary portion 58 has a bottom portion 61, a portion of which is inclined downwardly and outwardly, and has upwardly extending sides 62. The sides 62 confine the cut materials to the bottom portion 61 of the chute 57. The lower end of the stationary chute portion 58 has spaced hook-shaped extensions 63 which partly encircle the rod 60. A lip 37' of the hopper 37 overlaps the upper end of the upper chute portion 58. The movable chute portion 59 has spaced hook-shaped extensions 64 which partly encircle the rod 60 to form a hinge 65. Cotter pins 66 prevent the rod 60 from shifting. The movable chute portion 59 can be pivoted to permit the cut materials to be discharged at various elevations. As illustrated in FIGURES 1 and 5, the cut materials can be discharged directly into a bushel basket 67. A link 68, pivotally connected to the movable chute portion 59, is capable of holding the movable chute portion 59 in different positions by engaging with the link 68 in apertures 69 and 70. The movable chute portion 59 can also be latched to the rod 52 by a spring clip 72 as shown by solid lines in FIGURE 1. Panels 73, 74, 75, and 76, secured to the frame 11 by suitable means such as screws s, completely enclose the cutter assembly 22 and the drive mechanism 40 so that the machine 10 is completely safe for small children and adults alike; the chute 57 also assists in closing off the motor 41. The panel 76 also serves as a deflector to deflect materials cut by the cutter assembly 22 onto the chute 57.

A handle 77 is generally U-shaped and tubular in construction. The handle 77 is pivoted by pins 78 along its arms. The ends of the arms 77 bear against the ends of the rod 60 when lifting force is applied to the bight 80 of the handle 77. When the handle 77 is in the position shown by the solid lines in FIGURE 5 the machine 10 can be easily rolled from place to place. Phantom lines PL''' indicate the position into which the handle 77 can be pivoted to facilitate storage of the machine 10.

The electrical cord 43 is shown to pass through a grommet 81 in the panel 74. Since the grommet 81 has an opening which is smaller than the electrical connector 44, the connector 44 is not capable of passing through the grommet out of reach.

Should the need arise for sharpening the knife 23 and the cutter reel 29, the entire cutter assembly 22 can be readily removed and sharpened, as any reel-type lawn mower cutter assembly would be sharpened. When the hopper 37 and the screws 34 and 36 have been removed, the cutter assembly 22 can be easily lifted out of the frame 11.

The entire machine 10 can be sold in the disassembled condition and subsequently assembled by the user. The machine 10 is so compact, however, that it might be shipped in assembled condition, if desired.

By way of example but not to limit the invention, the motor 41 can have ¼ horsepower, operating at about 1750 r.p.m., with the pulley 45 having a diameter of about 2½ inches, with the pulley 46 having a diameter of about 4 inches, with the cutter reel 29 having a radius, measured from the center line of the shaft 32, of about 3 inches, with the cutter reel 29 having five blades 30, and with the knife preferably adjusted so as to provide a slight clearance with the blades 30 as the cutter reel 29 rotates.

The above-described embodiment being exemplary only it is to be understood that modifications in form or detail can be made without departing from the spirit and scope of the invention.

What is claimed is:

1. In combination: a frame, a hopper mounted on said frame for receiving materials to be cut, a cutter assembly disposed at the discharge end of said hopper, said cutter assembly including a pair of spaced apart mounting plates, a brace spanning the distance between and rigidly connecting said mounting plates, an elongated knife extending between said mounting plates, means for adjustably securing said knife at each end to one of said mounting plates, a cutter reel disposed between said mounting plates substantially parallel to said elongated knife, said cutter reel including a cutter shaft rotatably mounted in said mounting plates, a plurality of cutter blades carried by said cutter shaft in cutting relationship with said elongated knife, a chute mounted in said frame for discharging materials which have been cut by said cutter assembly, a pulley secured to said cutter shaft, a motor disposed below said cutter assembly and having a drive shaft, a pulley secured to said drive shaft, an endless flexible belt trained over said pulleys, means for pivotally mounting said motor to said frame so that at least some of the weight of said motor tensions said endless belt, and cam means for selectively holding said motor in a raised position to relieve the tension on said endless belt.

2. In combination: a frame having two pairs of legs, a hopper for materials to be cut, a cutter assembly at the discharge end of said hopper, means for driving said cutter assembly, a chute down which cut materials can slide, said chute having a stationary upper chute portion and movable lower chute portion, a rod connecting one pair of said legs, wheels rotatably mounted at the lower end of said one pair of legs, the lower end of said upper chute portion being secured to said rod, the upper end of said lower chute portion being pivotally connected to said rod, a U-shaped handle pivotally mounted to another pair of said legs, said handle having parallel arms joined to a bight, the ends of said arms exerting a force against said rod when a lifting force is applied to said bight and being pivotal into a substantially upright position.

3. In combination: a cutter assembly including a pair of spaced apart mounting plates, a brace spanning the distance between and rigidly connecting said mounting plates, an elongated knife extending between said mounting plates, means for individually adjustably securing said knife at each end to one of said mounting plates, a cutter reel disposed between said mounting plates substantially parallel to said elongated knife, said cutter reel including a shaft rotatably mounted in said mounting plates, a plurality of cutter blades disposed in cutting relationship with said knife, and radially extending blade mounting members securely mounting said blades to said shaft, an upright frame, means removably securing said cutter assembly as a unit to said frame, a hopper mounted by said frame above said cutter assembly, a chute mounted by said frame down which cut materials which have been cut by said cutter assembly can pass, an electric motor disposed in said frame below said cutter assembly, and means drivingly connecting said electric motor and said shaft.

References Cited by the Examiner

UNITED STATES PATENTS

| 2,232,828 | 2/1941 | Roddy | 146—123 X |
| 2,471,356 | 5/1949 | Slick | 146—123 X |
| 3,040,794 | 6/1962 | Jacobsen et al. | 146—107 |
| 3,078,892 | 2/1963 | Shoemaker | 146—123 |

FOREIGN PATENTS

| 144,065 | 12/1935 | Austria. |
| 552,188 | 1/1923 | France. |

WILLIAM W. DYER, Jr., *Primary Examiner.*

W. GRAYDON ABERCROMBIE, *Examiner.*